US010127419B1

(12) United States Patent
Tungala et al.

(10) Patent No.: US 10,127,419 B1
(45) Date of Patent: Nov. 13, 2018

(54) RADIO-FREQUENCY IDENTIFICATION (RFID) FOR INVENTORY OF ELECTRONIC EQUIPMENT

(71) Applicant: FUJITSU LIMITED, Kawasaki-Shi, Kanagawa (JP)

(72) Inventors: Naga Raghavendra Anudeep Tungala, Richardson, TX (US); Harold Clay Wispell, II, Celina, TX (US)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/819,437

(22) Filed: Nov. 21, 2017

(51) Int. Cl.
*G06Q 90/00* (2006.01)
*G06K 7/10* (2006.01)
*G06Q 10/08* (2012.01)

(52) U.S. Cl.
CPC ....... *G06K 7/10366* (2013.01); *G06Q 10/087* (2013.01)

(58) Field of Classification Search
CPC ............................... G06K 17/00; G06K 19/00
USPC .................................................. 235/375, 385
See application file for complete search history.

(56) References Cited

U.S. PATENT DOCUMENTS

2014/0117083 A1* 5/2014 Elberbaum ............. G06F 19/00 235/375
2015/0347800 A1* 12/2015 Kobayashi ............. G01R 22/06 235/375

OTHER PUBLICATIONS

"Applying RSSI filters for optimal RFID performance." RFID Arena, www.rfidarena.com/2013/8/28/applying-rssi-filters-for-optimal-rfid-performance.aspx; 6 pages, Aug. 28, 2013.

* cited by examiner

*Primary Examiner* — Jamara Franklin
(74) *Attorney, Agent, or Firm* — Baker Botts L.L.P.

(57) ABSTRACT

Methods and systems for RFID for inventory of electronic equipment may employ a regressive location algorithm to identify specific locations of electronic equipment having a mobile RFID tag based on a power value associated with an RFID scan. In this manner, electronic equipment housed within metal chassis and not externally visible may be identified with a desired accuracy of location.

13 Claims, 4 Drawing Sheets

100
102-1
102-2
104-1
110-1
109
104-2
110-2
108
106-1
110-3
106-2
110-4

RADIO-FREQUENCY IDENTIFICATION (RFID) FOR INVENTORY OF ELECTRONIC EQUIPMENT

BACKGROUND

Field of the Disclosure

The present disclosure relates to transportation boarding systems and, specifically, to a method and system for RFID for inventory of electronic equipment.

Description of the Related Art

Conventional methods of inventory of electronic equipment include manual operations to find, identify, and record the location of individual pieces of equipment. In order to reduce the time and effort to manage inventory information, electronic methods of inventory of electronic equipment have included using bar codes to label individual pieces of equipment and bar code scanners to identify and record the equipment at a particular location. However, the use of bar codes and bar code scanners for inventory of electronic equipment is limited in the degree of automation attained and is often associated with a large manual effort. Furthermore, the use of bar codes may be constrained for equipment that his housed and may not be visible or accessible for bar code scanning, such as telecommunications interfaces that are housed and used in a rack environment.

Furthermore, the use of RFID tags and conventional methods of inventory to detect equipment that is housed in metal enclosures and clustered together in a relatively high spatial density may be difficult or unworkable, because an exact location of an individual piece of RFID tagged equipment may be difficult or impossible to detect and identify with a desired accuracy of location.

SUMMARY

In one aspect, a disclosed method is for inventory of electronic equipment. The method may include downloading repository data from a radio frequency identification (RFID) tag database to a mobile computing device. In the method, the repository data may include a previous inventory of RFID tags for a facility, including fixed location tags indicative of locations at the facility and mobile tags indicative of electronic equipment at the facility. The method may further include obtaining, via an RFID scanner, first scan data of RFID tags at a first location at the facility. In the method, the first location may be associated with a first fixed location tag, while the first scan data may include at least one power value for each RFID tag. The method may further include averaging the power values for each RFID tag in the first scan data to calculate a first power value per RFID tag, sorting the RFID tags in the first scan data into fixed location tags and mobile tags, including the first power value per RFID tag, and determining a first location identifier for the first location from the fixed location tag, including identifying the first fixed location tag as the fixed location tag in the first scan data having the highest first power value. The method may still further include assigning the mobile tags in the first scan data to the first fixed location, obtaining, via the RFID scanner, second scan data of RFID tags at a second location at the facility. In the method, the second location may be associated with a second fixed location tag, while the second scan data may include at least one power value for each RFID tag. The method may still further include averaging the power values for each RFID tag in the second scan data to calculate a second power value per RFID tag, sorting the RFID tags in the second scan data into fixed location tags and mobile tags, including the second power value per RFID tag, determining a second location identifier for the second location, including identifying the second fixed location tag as the fixed location tag in the second scan data having the highest second power value, and assigning common mobile tags in both the first scan data and the second scan data to the second fixed location when the second power value for each of the common mobile tags is greater than the first power value.

In any of the disclosed implementations of the method, averaging the power values for each RFID tag in the second scan data may further include identifying new mobile tags in the second scan data, the new mobile tags identified as not being included in the previous inventory.

In any of the disclosed implementations, the method may further include assigning the new mobile tags in the second scan data to the second location.

In any of the disclosed implementations of the method, determining a location identifier for the first location may further include looking up location data for the first location in the previous inventory based on the first location identifier.

In any of the disclosed implementations of the method, assigning the mobile tags in the first scan data to the first fixed location may further include associating the mobile tags in the first scan data with the first location identifier.

In any of the disclosed implementations, the method may further include updating the repository data based on the first scan data and the second scan data.

In any of the disclosed implementations of the method, downloading the repository data, obtaining the first scan data, and obtaining the second scan data may be performed using at least one wireless interface.

Additional disclosed aspects for RFID for inventory of electronic equipment include an integrated mobile device including an RFID scanner, a processor, and memory media accessible to the processor and storing instructions executable by the processor, and a mobile device including a processor, and memory media accessible to the processor and storing instructions executable by the processor.

DETAILED DESCRIPTION

Figure 1:
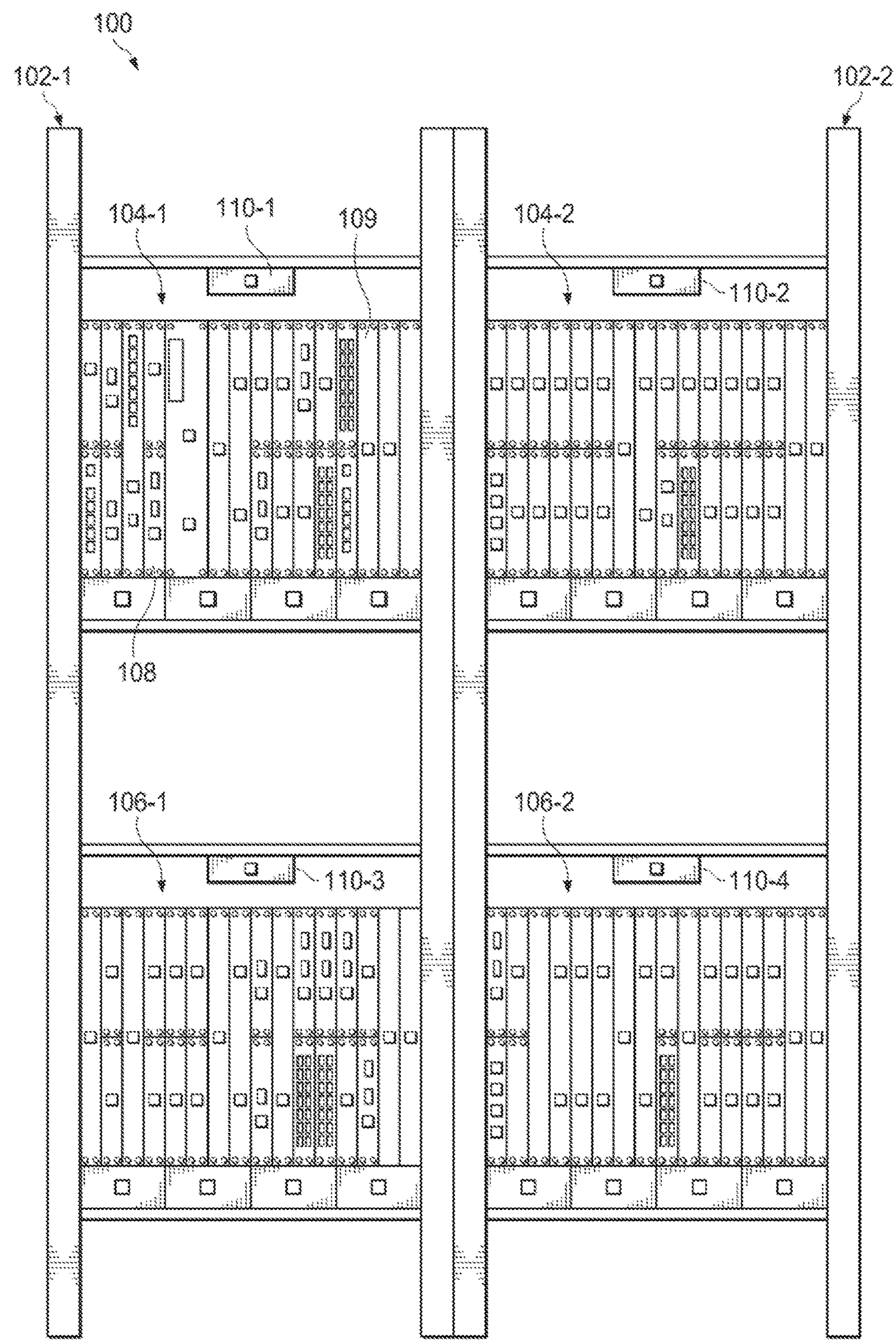
FIG. 1 is a depiction of a telecommunications equipment rack with electronic devices.

In the following description, details are set forth by way of example to facilitate discussion of the disclosed subject matter. It should be apparent to a person of ordinary skill in the field, however, that the disclosed implementations are exemplary and not exhaustive of all possible implementations.

As used herein, a hyphenated form of a reference numeral refers to a specific instance of an element and the un-hyphenated form of the reference numeral refers to the collective or generic element. Thus, for example, widget "72-1" refers to an instance of a widget class, which may be referred to collectively as widgets "72" and any one of which may be referred to generically as a widget "72".

As noted above, RFID tags and conventional methods of inventory are known. However, detecting electronic equipment that is housed in metal enclosures and clustered together in a relatively high spatial density may be difficult or unworkable using simple RFID scanning. For example, stray readings from RFID tags at nearby locations may complicate or obfuscate identifying the actual location of each RFID tag. As a result, using conventional RFID scanning methods, an exact location of an individual piece of RFID tagged equipment may be difficult or impossible to detect and identify with a desired accuracy of location with a large and complex facility having numerous locations and large numbers of RFID tags.

As will be described in further detail herein, a method and system for RFID for inventory of electronic equipment is disclosed that enables disambiguation of the location of individual RFID tags in proximity to one another. The method and system for RFID for inventory of electronic equipment disclosed herein may employ fixed location tags to identify locations within a facility, and dynamic tags to identify individual pieces of electronic equipment that may be used in different locations. The method and system for RFID for inventory of electronic equipment disclosed herein may include a regressive localization algorithm that improves the location accuracy of RFID scanning for identifying the location of mobile tags.

Turning now to the drawings, FIG. 1 is a depiction of a telecommunications equipment rack 100 configured with various electronic devices at a location in a facility. As will be explained in further detail, equipment rack 100 in FIG. 1 is shown comprising of racks 102, shelves 104, 106, fixed location tags 110, and electronic equipment 108, 109. Equipment rack 100, as shown, is an exemplary implementation for descriptive purposes and may be representative for various locations and facilities of different sizes and scopes.

In FIG. 1, equipment rack 100 may represent the housing and use of electronic equipment in a facility, such as a telecommunications laboratory. The facility may be comprised of various locations and various pieces of electronic equipment at each of the locations. Generally, the locations may correspond to a fixed location that is marked using a fixed location tags 110. In some instances, fixed location tags 110 may be used with certain mobile locations, such as an equipment cart (not shown) that can move around within the facility but is identified as a fixed location nonetheless. The electronic equipment is marked using mobile tags that are affixed to each individual piece of equipment. Both fixed location tags 110 and static location tags may be RFID tags that are associated with one or more values, including a unique identifier. The various information for the RFID tags at the facility may be stored in a central database that is accessible to a mobile device used for RFID scanning (see also FIG. 2).

Specifically, in FIG. 1, equipment rack 100 includes a first rack 102-1 located adjacent to a second rack 102-2. The distance between first rack 102-1 and second rack 102-1 may be smaller than a scanning range for RFID scanning, such that an RFID scanner operated in the vicinity of equipment rack 100 may detect a signal from mobile tags for electronic equipment housed in either first rack 102-1 or second rack 102-2. Each rack 102 includes a top shelf 104 and a bottom shelf 106. It will be understood that two shelves per rack are shown in FIG. 1 for descriptive purposes and that different numbers of shelves per rack may be used in different implementations. Each shelf 104, 106 in equipment rack 100 is associated with a fixed location tag 104. Specifically, top shelf 104-1 of first rack 102-1 is marked with fixed location tag 110-1; top shelf 104-2 of second rack 102-2 is marked with fixed location tag 110-2; bottom shelf 106-1 of first rack 102-1 is marked with fixed location tag 110-3; and bottom shelf 106-2 of second rack 102-2 is marked with fixed location tag 110-4.

Furthermore, each rack 102 is shown populated with various pieces of electronic equipment, which is typically housed using sheet-metal enclosures. The electronic equipment may be a plug-in rack device that occupies a certain width and height in a shelf. For example, full-height electronic device 109 and half-height electronic device 108 are labeled as exemplary instances of electronic equipment that may be marked with a mobile tag (not shown) that may not be externally visible. Full-height electronic device 109 is an enclosed device that populates an entire full-height slot in rack 102, while half-height electronic device 108 is an enclosed device that may share a full-height slot with another half-eight electronic device. Certain pieces of electronic equipment marked with mobile tags may include daughter modules (not visible) that are mounted onto parent rack devices that can accommodate a plurality of daughter modules.

During normal operation at the facility, the electronic devices may be added, removed, exchanged, and moved to different locations. When the facility is large and includes a large number of locations and personnel, such changes of the location of the electronic equipment relative to the fixed location tags 110 may occur constantly and in parallel by different individuals, such that it may not be apparent or possible to ascertain the location of each piece of electronic equipment at the facility at a given moment in time. However, because the electronic equipment is an important economic and technical resource, an owner of the facility may desire to perform an inventory to keep track of each piece of the electronic equipment and its respective location. Thus, the method and system for RFID for inventory of electronic equipment disclosed herein may be used to perform an inventory of the electronic equipment using a wireless RFID scanner, a mobile device, and a regressive software algorithm for accurate location identification of the mobile tags in equipment rack 100.

Figure 2:
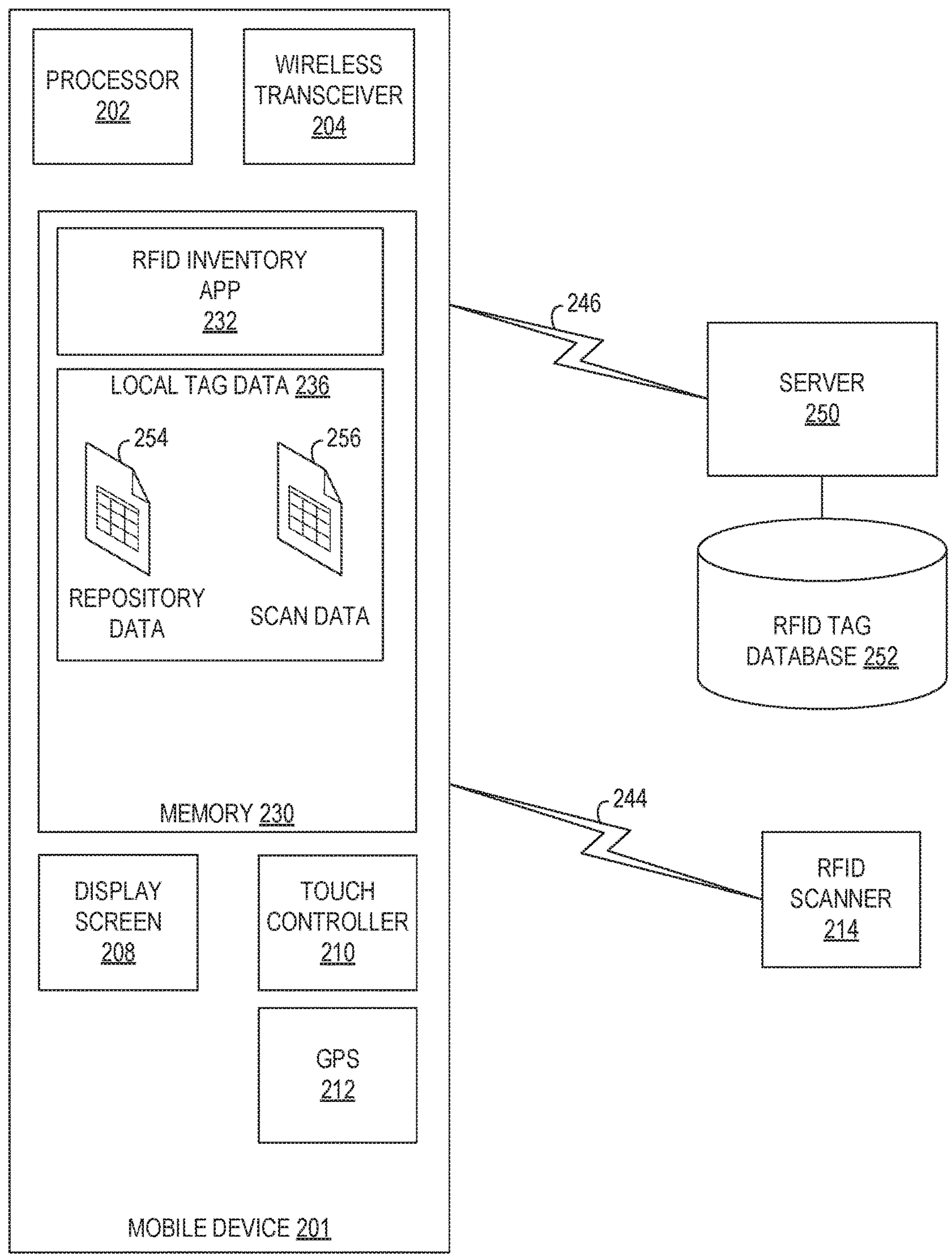
FIG. 2 is a block diagram of selected elements of an implementation of a system for RFID inventory of electronic devices.

In operation, the method and system for RFID for inventory of electronic equipment disclosed herein may be performed using a mobile device, such as a tablet or a laptop computer that is coupled to an RFID scanner (see also FIG. 2). The mobile device may be coupled to the RFID scanner using a wired or a wireless interface. The mobile device may further wirelessly access an RFID tag database that stores all tag information for the facility, including the results of each inventory performed. In this manner, the mobile device may be carried, along with the RFID scanner, to different locations within the facility to perform RFID scanning for the inventory.

Specifically, a RFID inventory app may be executed on the mobile device that performs actions and data processing for performing the inventory, as will be described in further detail herein. The RFID inventory app may be configured to communicate with a server that provides access to the RFID tag database. Thus, when the RFID inventory app is started and initialized, repository data for all known tags and locations from the facility may first be retrieved. The repository data may represent the results of a previous inventory that was performed at the facility, including a partial inventory of certain locations in the facility. The repository data may be sorted according to fixed location tags and mobile tags, which have been explained above.

Then, the RFID scanner may be placed in proximity to a first location, such as top shelf 104-1 of first rack 102-1 and RFID scanning may be performed to generate first scan data. The RFID scanning may involve emitting RF radiation by the RFID scanner that is used by each tag to reflect and emit a tag reading back to the RFID scanner. The tag reading may include various fields of information, including a unique identifier and a power value. For example, the unique identifier may be an electronic product code (EPC) conforming to an EPC tag data standard (TDS) promulgated by GS1 (www.gs1.org). The power value may be a received signal strength indicator (RSSI) that is indicative of the RF power received at the tag during the RFID scanning. The RFID scanning may be a continuous operation that results in one or more readings per tag as long as the RFID scanning is active.

Accordingly, when the RFID scanning is performed at the first location, a plurality of different readings from different RFID tags in proximity to the first location may be received, as well as a plurality of separate readings from each of the RFID tags as the RFID scanning is repeated. It is noted that the number of readings received during RFID scanning may not be constant or known in advance. In the case of top shelf 104-1, the first scan data may include values from one or more fixed location tags 110 as well as a plurality of mobile tags, including a plurality of power values for each tag. The RFID scanning app may then average the power values for each tag from the first scan data. The first scan data may include new tags that were not present in the repository data. Then, the tags from the first scan data may be sorted into fixed location tags and mobile tags, which may be identified from values in the tag reading, such as a particular field of information specifying fixed location tags or mobile tags. From the fixed location tags in the first scan data, the first location may be identified from the first scan data as the fixed location tag having the largest power value. In the case of the first scan data, because the RFID scanner was placed in proximity to fixed location tag 110-1, fixed location tag 110-1 will have the highest power value and will be identified as the first location. Then, all the mobile tags in the first scan data will be assigned to the first location, and will be indexed to fixed location tag 110-1 on the mobile device.

Subsequently, the RFID scanner will be placed in proximity to a second location at fixed location tag 110-2 (to scan top shelf 104-2 of rack 102-2) and RFID scanning may be performed to generate second scan data. The second location may be identified in a similar manner as described above for the first location. Additionally, any new mobile tags in the second scan data may be assigned to the second location. For existing mobile tags scanned at both the first location and the second location, the mobile tags may be assigned to the second location when the second scan data has a higher power value than the first scan data for the individual mobile tag. In this manner, the electronic devices located at the first location may be disambiguated from the electronic devices at the second location, based on the power values observed, which will be lower as the relative distance between the RFID scanner and a scanned tag increases. It will be understood that the regressive algorithm described above may be repeated for all locations, and that as the number of proximate locations scanned is increased, the reliability and accuracy of the inventory will also be improved.

After the RFID scanning at the desired locations is completed, the repository data may be updated with the new scan data to complete the inventory.

Referring now to FIG. 2, a block diagram of selected elements of an implementation of a system 200 for RFID inventory of electronic equipment, as disclosed herein, is depicted. System 200 is shown in an exemplary configuration for descriptive purposes and may be operated with different elements, as desired.

Specifically, system 200 is shown including mobile device 201, which may represent any of a variety of mobile devices with communication and data processing capability. In various implementations, mobile device 201 is a tablet or a smart phone that may include various functionality selected from: cellular telephony, wireless networking, location sensing, motion sensing, digital imaging (i.e., a camera), touch screen operation, multimedia playback, and data storage, among others. In certain implementations, mobile device 201 may include, or may represent, a wearable device that may be worn on the body of a user and/or may be integrated into an article of clothing of a user (not shown). In some implementations, mobile device 201 may include or integrate functionality for RFID scanning, such as shown externally to mobile device 201 in FIG. 2 with RFID scanner 214. Accordingly, while certain aspects of mobile device 201 are shown in FIG. 2 for descriptive purposes, it will be understood that, in different implementations, mobile device 201 may include different types of functionality.

As shown in FIG. 2, mobile device 201 includes processor 202 and memory 230 that may store data and instructions executable by processor 202. Also, memory 230 may store RFID inventory app 232 that is executable by processor 202 to enable functionality for RFID inventory of electronic equipment, as described herein. Memory 230 may also store local tag data 236, that may include repository data 254 and scan data 256. Repository data 254 may represent data downloaded from RFID tag database 252 from a previous inventory. Scan data 256 may represent scan data collected by mobile device 201 using RFID scanner 214 at different locations. It is noted that various apps executing on mobile device 201 may be configured to access diverse types of functionality included with mobile device 201, such as, but not limited to, imaging, communication, location-based services, gestures, touch input, motion of mobile device 201, Internet-connectivity, etc.

In FIG. 2, mobile device 201 may include at least one instance of wireless transceiver 204, which may provide wireless connectivity to various types of wireless networks, such as cellular telephony networks (e.g., 3G, 4G, LTE), wireless local area networks (e.g., IEEE 802.11), wireless personal area networks (e.g., Bluetooth®), among others. Display screen 208 and touch controller 210 may operate in combination to provide a touch-screen display for output to and control by the user. Mobile device 201 is also shown including at least one instance of global positioning sensor (GPS) 212, which may be used to generate absolute location data. It is noted that in certain implementations, mobile device 201 may not include GPS 212, or may not rely upon GPS 212 when present, for location data.

Also in FIG. 2, mobile device 201 is shown interacting with RFID scanner 214 via wireless link 244 representing wireless connectivity. Accordingly, wireless link 244 may be a wireless personal area network (WPAN), among other wireless networks. Mobile device 201 is also shown interacting with server 250 to access RFID tag database 252 using wireless link 246 representing wireless connectivity. Accordingly, wireless link 246 may be a wireless local area network (WLAN), a wireless wide area network (WWAN), or a cellular telephony network, among other wireless networks. As noted above, in certain implementations, RFID scanner 214, or similar RFID scanning functionality, may be integrated within mobile device 201 as a subsidiary or subcomponent.

Figure 3:
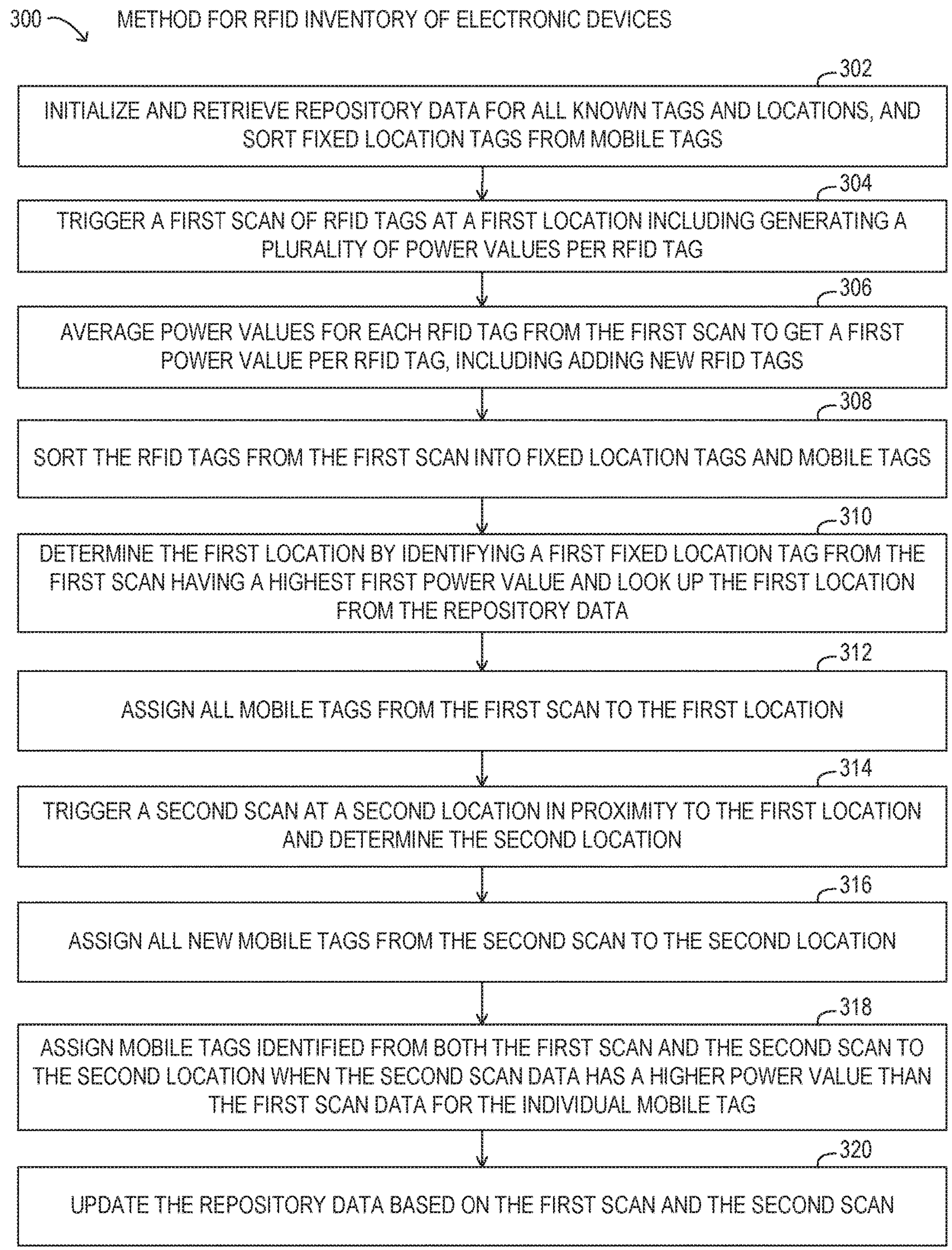
FIG. 3 is a flowchart depicting selected elements of an implementation of a method for RFID inventory of electronic devices.

Turning now to FIG. 3, a block diagram of selected elements of an implementation of method 300 for RFID inventory of electronic equipment is depicted in flow-chart form. Method 300 may be performed by RFID inventory app 232 at mobile device 201 (see FIG. 2), for example, in conjunction with RFID tag database 252. It is noted that certain operations described in method 300 may be optional or may be rearranged in different implementations.

Method 300 may begin, at step 302, by initializing and retrieving repository data for all known tags and locations and sorting fixed location tags from mobile tags. At step 304, a first scan of RFID tags is triggered at a first location including generating a plurality of power values per RFID tag. To perform the first scan in step 304, the RFID scanner may be placed in proximity to the first location. Also in step 304, first scan data from the first scan are received. At step 306, power values for each RFID tag are averaged from the first scan to get a first power value per RFID tag, including adding new RFID tags. At step 308, the RFID tags from the first scan are sorted into fixed location tags and mobile tags. At step 310, the first location is determined by identifying a first fixed location tag from the first scan having a highest first power value and looking up the first location from the repository data for the first fixed location tag. At step 312, all mobile tags from the first scan are assigned to the first location. At step 314, a second scan is triggered at a second location in proximity to the first location and determine the second location. To perform the second scan in step 314, the RFID scanner may be placed in proximity to the second location. Also in step 314, second scan data from the second scan are received. The second location may be determined in step 314 in a similar manner as described above for the first location in step 310. At step 316, all new mobile tags from the second scan are assigned to the second location. The new mobile tags may be identified in step 316 as not being included in the repository data. At step 318, mobile tags identified from both the first scan and the second scan are assigned to the second location when the second scan data has a higher power value than the first scan data for the individual mobile tag. At step 320, the repository data is updated based on the first scan and the second scan. At step 320, the new inventory resulting from the first scan and the second scan may be written to the repository data and may replace previous inventories, such as previous inventories for the first location and the second location. Furthermore, it will be understood that while method 300 is described in terms of a first scan and a second scan, the regressive procedure described in method 300 may be similarly repeated for a plurality of subsequent scans in addition to the second scan, which may be similarly processed as described for the second scan. It is further noted that as the number of locations scanned increases, particularly when those scanned locations are in proximity to one another, the accuracy of the resulting inventory with respect to the determined locations of individual mobile tags (representing pieces of electronic equipment) may be improved or optimized. In particularly large facilities having large numbers of locations and pieces of electronic equipment, method 300 may be used as described with a correspondingly large number of subsequent scans.

Figure 4:
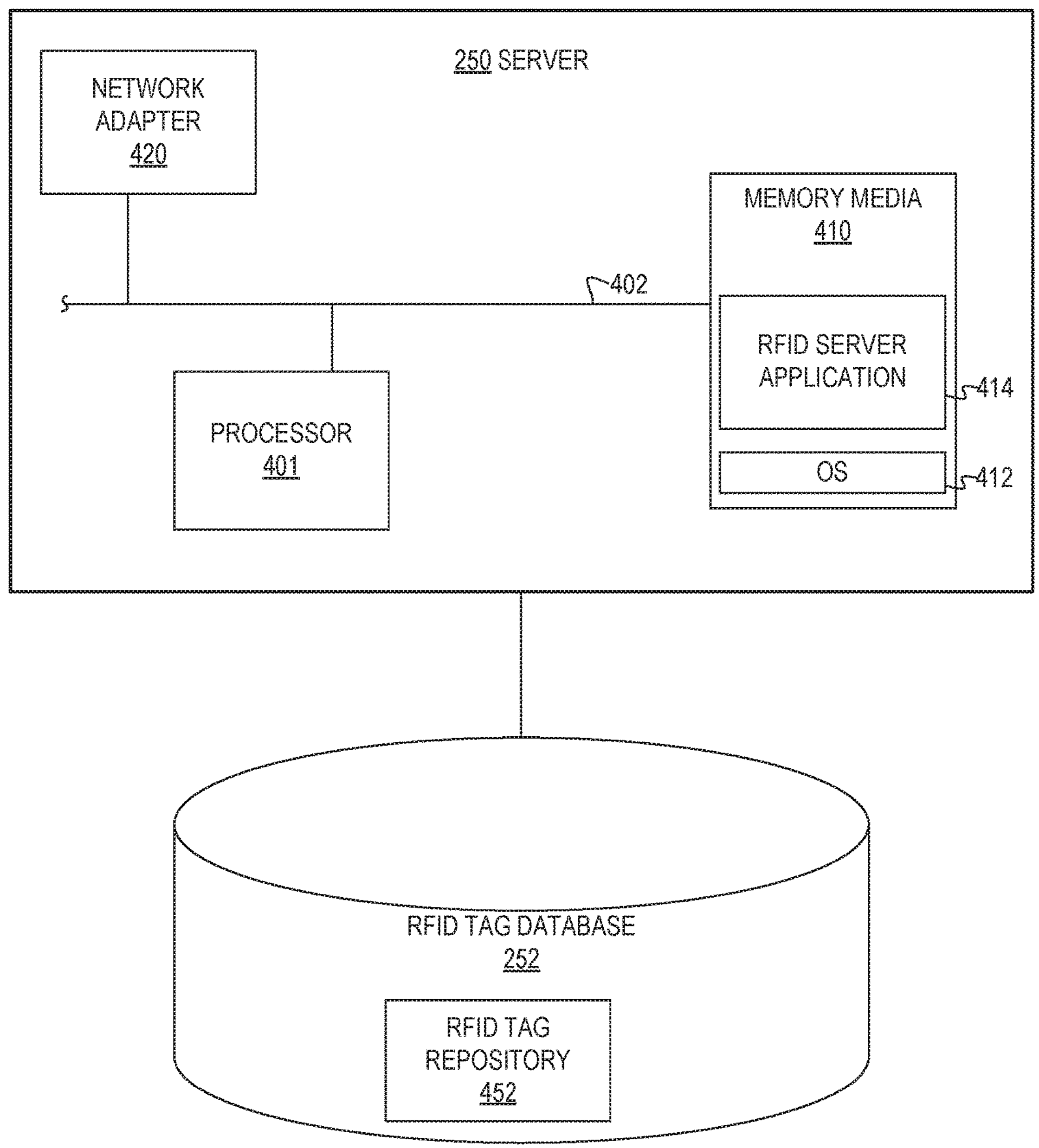
FIG. 4 is a block diagram of selected elements of an implementation of a server for RFID inventory of electronic devices.

Referring now to FIG. 4, a block diagram showing selected elements of an implementation of a server 250 is illustrated. FIG. 4 provides additional details of server 250 shown in FIG. 2. As depicted in FIG. 4, server 250 includes processor 401 and memory media 410, which may communicate using system bus 402. Also shown accessible via system bus 402 is network adapter 420 that may provide connectivity to a network.

As shown in FIG. 4, memory media 410 may represent volatile, non-volatile, fixed, and/or removable media, and may be implemented using magnetic and/or semiconductor memory. Memory media 410 is capable of storing instructions and/or data. As shown, memory media 410 stores instructions (i.e., code executable by processor 401) including operating system (OS) 412 and RFID server application 414. Operating system 412 may be any of a variety of operating systems, such as a UNIX variant, LINUX, a Microsoft Windows® operating system, or a different operating system. RFID server application 414 may embody various applications and functionality, for example, for providing access to RFID tag database 252 to RFID inventory app 232, among other functionality. Also shown in FIG. 4 is RFID tag database 252, which may be hosted by server 250 for providing structured data storage. RFID tag database 252 may inventory information for the facility, including fixed location tags and mobile tags. It is noted that, in certain implementations, RFID tag database 252 may be included with server 250.

As disclosed herein, methods and systems for RFID for inventory of electronic equipment may employ a regressive location algorithm to identify specific locations of electronic equipment having a mobile RFID tag based on a power value associated with an RFID scan. In this manner, electronic equipment housed within metal chassis and not externally visible may be identified with a desired accuracy of location.

The above disclosed subject matter is to be considered illustrative, and not restrictive, and the appended claims are intended to cover all such modifications, enhancements, and other implementations which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for inventory of electronic equipment, the method comprising:

downloading repository data from a radio frequency identification (RFID) tag database to a mobile computing device, wherein the repository data comprises a previous inventory of RFID tags for a facility, including fixed location tags indicative of locations at the facility and mobile tags indicative of electronic equipment at the facility;

obtaining, via an RFID scanner, first scan data of RFID tags at a first location at the facility, wherein the first location is associated with a first fixed location tag, and wherein the first scan data includes at least one power value for each RFID tag;

averaging the power values for each RFID tag in the first scan data to calculate a first power value per RFID tag;

sorting the RFID tags in the first scan data into fixed location tags and mobile tags, including the first power value per RFID tag;

determining a first location identifier for the first location from the fixed location tag, including identifying the first fixed location tag as the fixed location tag in the first scan data having the highest first power value;

assigning the mobile tags in the first scan data to the first fixed location;

obtaining, via the RFID scanner, second scan data of RFID tags at a second location at the facility, wherein the second location is associated with a second fixed location tag, and wherein the second scan data includes at least one power value for each RFID tag;

averaging the power values for each RFID tag in the second scan data to calculate a second power value per RFID tag;

sorting the RFID tags in the second scan data into fixed location tags and mobile tags, including the second power value per RFID tag;

determining a second location identifier for the second location, including identifying the second fixed location tag as the fixed location tag in the second scan data having the highest second power value; and assigning common mobile tags in both the first scan data and the second scan data to the second fixed location when the second power value for each of the common mobile tags is greater than the first power value.

2. The method of claim 1, wherein averaging the power values for each RFID tag in the second scan data further comprises:

identifying new mobile tags in the second scan data, the new mobile tags identified as not being included in the previous inventory.

3. The method of claim 2, further comprising:

assigning the new mobile tags in the second scan data to the second location.

4. The method of claim 1, wherein determining a location identifier for the first location further comprises:

looking up location data for the first location in the previous inventory based on the first location identifier.

5. The method of claim 1, wherein assigning the mobile tags in the first scan data to the first fixed location further comprises:

associating the mobile tags in the first scan data with the first location identifier.

6. The method of claim 1, further comprising:

updating the repository data based on the first scan data and the second scan data.

7. A mobile device for inventory of electronic equipment, the mobile device comprising:

a processor; and memory media accessible to the processor and storing instructions executable by the processor for:

downloading repository data from a radio frequency identification (RFID) tag database to the mobile device, wherein the repository data comprises a previous inventory of RFID tags for a facility, including fixed location tags indicative of locations at the facility and mobile tags indicative of electronic equipment at the facility;

obtaining, via an RFID scanner, first scan data of RFID tags at a first location at the facility, wherein the first location is associated with a first fixed location tag, and wherein the first scan data includes at least one power value for each RFID tag;

averaging the power values for each RFID tag in the first scan data to calculate a first power value per RFID tag;

sorting the RFID tags in the first scan data into fixed location tags and mobile tags, including the first power value per RFID tag;

determining a first location identifier for the first location from the fixed location tag, including identifying the first fixed location tag as the fixed location tag in the first scan data having the highest first power value;

assigning the mobile tags in the first scan data to the first fixed location;

obtaining, via the RFID scanner, second scan data of RFID tags at the second location, wherein the second location is associated with a second fixed location tag, and wherein the second scan data includes at least one power value for each RFID tag;

averaging the power values for each RFID tag in the second scan data to calculate a second power value per RFID tag;

sorting the RFID tags in the second scan data into fixed location tags and mobile tags, including the second power value per RFID tag;

determining a second location identifier for the second location, including identifying the second fixed location tag as the fixed location tag in the second scan data having the highest second power value; and assigning common mobile tags in both the first scan data and the second scan data to the second fixed location when the second power value for each of the common mobile tags is greater than the first power value.

8. The mobile device of claim 7, wherein averaging the power values for each RFID tag in the second scan data further comprises:

identifying new mobile tags in the second scan data, the new mobile tags identified as not being included in the previous inventory.

9. The mobile device of claim 8, further comprising instructions for:

assigning the new mobile tags in the second scan data to the second location.

10. The mobile device of claim 7, wherein determining a location identifier for the first location further comprises:

looking up location data for the first location in the previous inventory based on the first location identifier.

11. The mobile device of claim 7, wherein assigning the mobile tags in the first scan data to the first fixed location further comprises:

associating the mobile tags in the first scan data with the first location identifier.

12. The mobile device of claim 7, further comprising instructions for:

updating the repository data based on the first scan data and the second scan data.

13. The mobile device of claim 7, wherein downloading the repository data, obtaining the first scan data, and obtaining the second scan data are performed using at least one wireless interface.

* * * * *